United States Patent
Stadtfeld

(10) Patent No.: US 11,826,842 B2
(45) Date of Patent: Nov. 28, 2023

(54) INDEPENDENT PRESSURE ANGLE CORRECTIONS FOR POWER SKIVING

(71) Applicant: THE GLEASON WORKS, Rochester, NY (US)

(72) Inventor: Hermann J. Stadtfeld, Webster, NY (US)

(73) Assignee: THE GLEASON WORKS, Rochester, NY (US)

(*) Notice: Subject to any disclaimer, the term of this patent is extended or adjusted under 35 U.S.C. 154(b) by 320 days.

(21) Appl. No.: 17/296,029

(22) PCT Filed: Dec. 19, 2019

(86) PCT No.: PCT/US2019/067451
§ 371 (c)(1),
(2) Date: May 21, 2021

(87) PCT Pub. No.: WO2020/132228
PCT Pub. Date: Jun. 25, 2020

(65) Prior Publication Data
US 2022/0009015 A1 Jan. 13, 2022

Related U.S. Application Data

(60) Provisional application No. 62/783,439, filed on Dec. 21, 2018.

(51) Int. Cl.
*B23F 5/16* (2006.01)

(52) U.S. Cl.
CPC ....... *B23F 5/163* (2013.01); *Y10T 409/10477* (2015.01); *Y10T 409/10795* (2015.01); *Y10T 409/105565* (2015.01)

(58) Field of Classification Search
CPC .... B23F 5/16; B23F 5/163; Y10T 409/10477; Y10T 409/105088; Y10T 409/105247; Y10T 409/105565; Y10T 409/107791; Y10T 409/10795
(Continued)

(56) References Cited

U.S. PATENT DOCUMENTS 1,913,865 A * 6/1933 Wildhaber .............. B23F 21/10
407/28
1,924,476 A * 8/1933 Wildhaber ................ B23F 5/22
409/12
(Continued)

FOREIGN PATENT DOCUMENTS

DE 19523015 A1 * 1/1997 ............. F16H 55/08
DE 102014108438 A1 * 12/2015 ............ B23F 19/002
(Continued)

OTHER PUBLICATIONS

Stadtfeld, Hermann J., "Power Skiving of Cylindrical Gears on Different Machine Platforms", Gear Technology, Jan./Feb. 2014, pp. 52-62.
(Continued)

*Primary Examiner* — Erica E Cadugan
*Assistant Examiner* — Michael Vitale
(74) *Attorney, Agent, or Firm* — Robert L. McDowell

(57) ABSTRACT

A power skiving method wherein three-dimensional cutter rotations relative to gear workpiece tooth flank surfaces are carried out so as to reposition the cutter relative to a gear workpiece so as to achieve a decrease and/or an increase in the pressure angle of the tooth flank surfaces. The method can be applied independently to left and right flank surfaces of a tooth slot or the rotations may be superimposed on one another to realize pressure angle corrections on both tooth flanks of a tooth slot.

7 Claims, 6 Drawing Sheets

(58) Field of Classification Search
USPC .......................... 409/31, 33, 34, 36, 50, 51
See application file for complete search history.

(56) References Cited

U.S. PATENT DOCUMENTS

| | | | | |
|---|---|---|---|---|
| 2,505,269 | A * | 4/1950 | Wildhaber | B23F 9/10 |
| | | | | 409/26 |
| 2,669,904 | A * | 2/1954 | Bloomfield | B23F 19/007 |
| | | | | 409/33 |
| 3,765,303 | A * | 10/1973 | Fischer | F16H 55/0806 |
| | | | | 29/893.35 |
| 4,565,474 | A * | 1/1986 | Charles | B23F 17/001 |
| | | | | 451/147 |
| 5,174,699 | A | 12/1992 | Faulstich | |
| 6,837,123 | B2 * | 1/2005 | Hawkins | F16H 55/08 |
| | | | | 74/462 |
| 2014/0234043 | A1 | 8/2014 | Nakahara et al. | |
| 2016/0129511 | A1 | 5/2016 | Otani et al. | |
| 2016/0167145 | A1 * | 6/2016 | Vogel | B23F 5/163 |
| | | | | 409/36 |

FOREIGN PATENT DOCUMENTS

| | | | |
|---|---|---|---|
| EP | 3272448 A1 * | 1/2018 | |
| WO | 2018/039118 A1 | 3/2018 | |

OTHER PUBLICATIONS

International Search Report and Written Opinion for PCT/US2019/067451, ISA/EPO, dated Aug. 3, 2020, 12 pgs.

\* cited by examiner

Pressure Angle Reduction Principal

FIG. 4(a) Pressure Angle Increase Principal
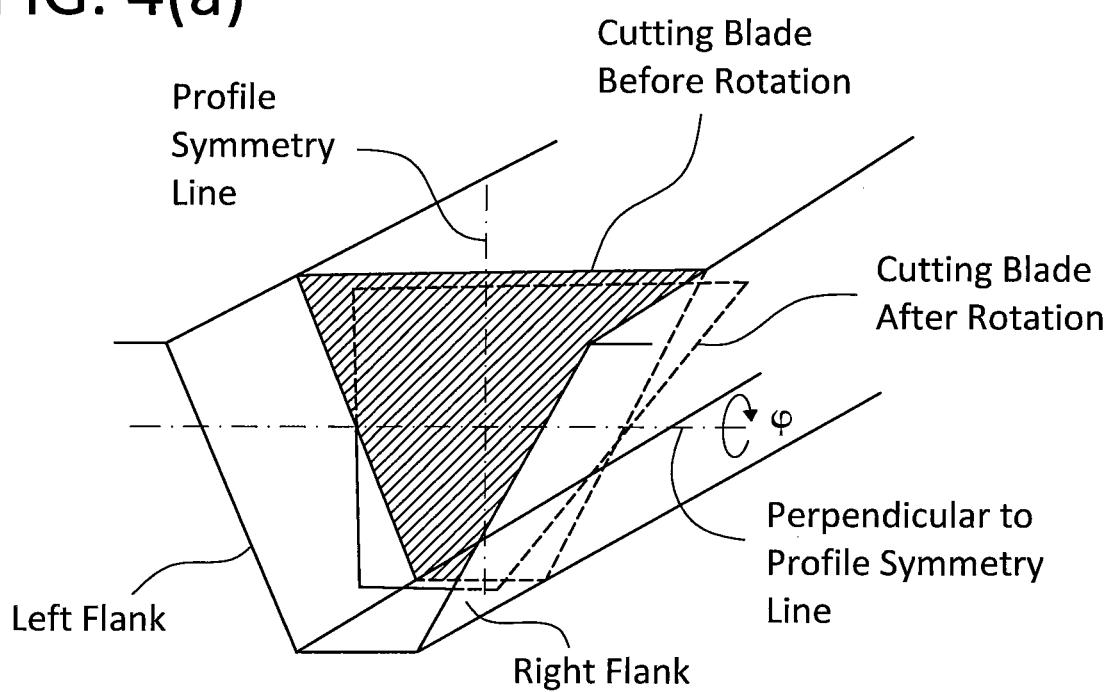
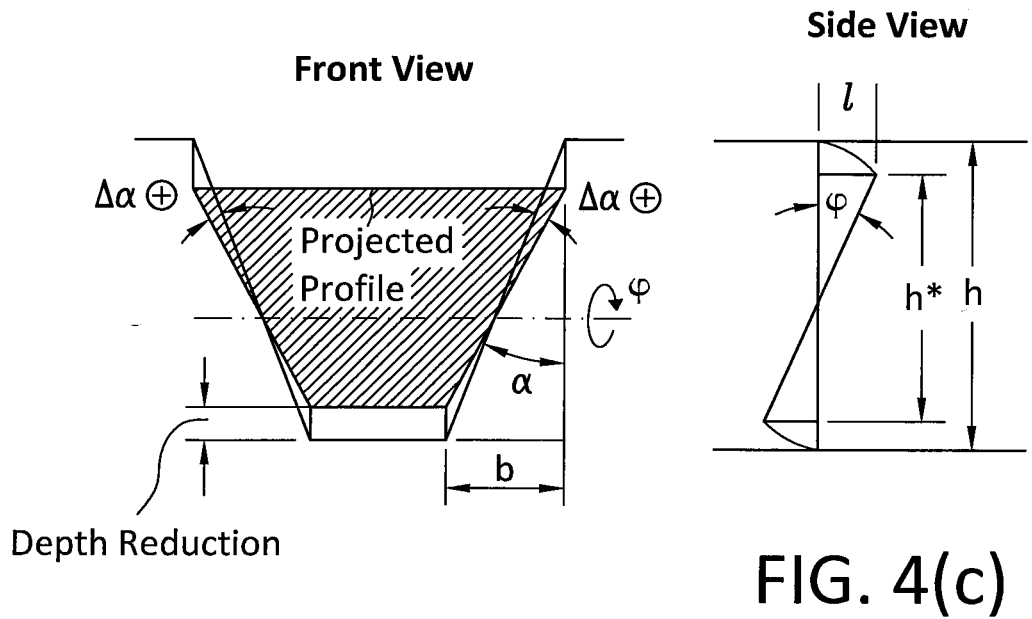
FIG. 4(b)
FIG. 4(c)

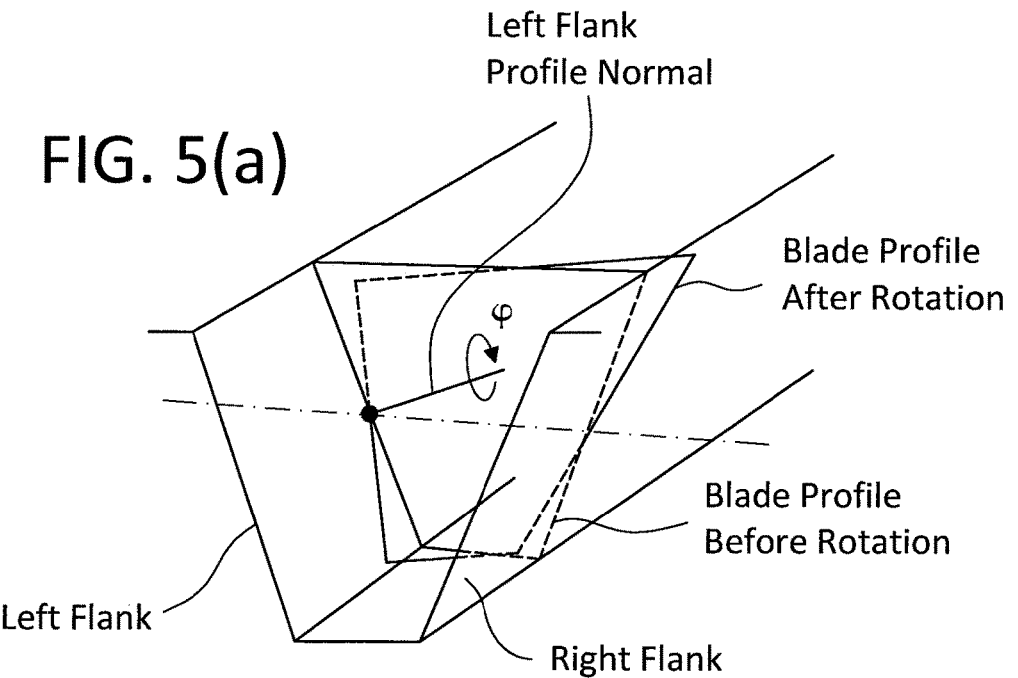
FIG. 5(a)
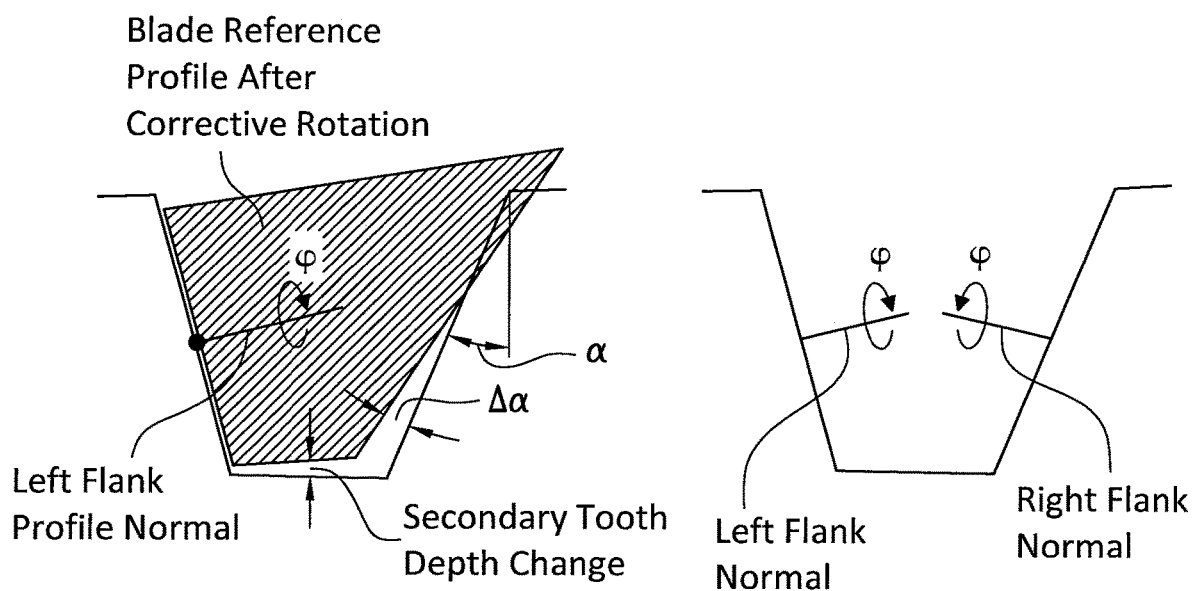
FIG. 5(b)
FIG. 5(c)

The Gear Workpiece is either a Spur Gear Workpiece or a Helical Gear Workpiece

FIG. 6

The Teeth of the Gear Workpiece are either Internal Gear Teeth or External Gear Teeth

FIG. 7

INDEPENDENT PRESSURE ANGLE CORRECTIONS FOR POWER SKIVING

FIELD OF THE INVENTION

The invention is directed to the manufacture of gears by power skiving and in particular to a method for providing independent pressure angle corrections to the flank surfaces of the gear teeth using cutter inclinations.

BACKGROUND OF THE INVENTION

Skiving of cylindrical gears (also known as "hob peeling" or "power skiving") is a cutting process that has existed for many years, primarily for manufacturing internal ring gears (e.g. see DE 243514). Like honing, power skiving uses the relative sliding motion between two "cylindrical gears" whose axes are inclined. A power skiving cutter usually looks like a shaping cutter with a helix angle, for example 20°, different than the helix angle of the cylindrical gear to be machined (e.g. US 2011/0268523). Other power skiving tools comprise bar- or stick-shaped cutting blades arranged in a cutter head such as shown in, for example, US 2012/0282055 or U.S. Pat. No. 9,956,627. Power skiving of internal or external cylindrical (spur and helical) gears may be carried out on any of several commercially available computer-controlled (CNC) multi-axis machines such as, for example, the machines disclosed in U.S. Pat. No. 6,712,566 or 9,956,627, the disclosures of which are hereby incorporated by reference.

The geometric setup of a skiving cutter relative to an internal ring gear is shown in FIG. 1. The front view onto the generating gear system is shown in the upper left graphic. The ring gear is oriented in the main coordinate system with its axis of rotation collinear to the Y-axis. The cutter center (origin of Rw) is positioned out of the center of $Y_4$ in the $X_4$-$Z_4$ plane by a radial distance vector Ex. The pitch circles of the cutter and the ring gear contact tangentially at the lowest point of the pitch circle. The top view which shows the tool inclination angle or shaft angle Σ is drawn below the front view. In case of a spur gear the stroke motion is directed in line with the Y-axis. The relative velocity required as cutting motion is generated with a shaft angle Σ around the $X_4$-axis of the coordinate system shown in FIG. 1. In case of a helical gear, the cutter inclination can be chosen independently from the helix angle. However, a helix angle of 20° or larger offers the possibility to match it with the shaft angle Σ and use a simplified spur gear style shaper cutter for the skiving operation. Also in this case, the stroke motion is oriented in Y direction but an incremental rotation $\omega_2$ which depends on the stroke feed has to be added to $\omega_1$. The shaft angle Σ can also be defined differently than the helix angle which still will require the same incremental $\omega_2$, but the tool front face orientation and side relief angles have to be calculated from the difference between helix angle and the shaft angle Σ.

The side view to the right in FIG. 1 shows a second possible tool inclination which is called the tilt angle. This tool tilt angle can be used to increase the effective relief angles between the blades and the slots and it can also be utilized to eliminate interferences between the back side of a long spur gear style shaper cutter with minimum relief angles.

It may be desirable to independently correct the pressure angles of the cutter during the development of workpieces and/or the power skiving process for manufacturing the workpieces. In the case of large pressure angle changes, it is common that the profiles on the cutting teeth of the power skiving cutter disk are re-worked. Often, however, the re-working of the profiles is not possible because the slot width of the workpiece has to be maintained. The solution in most cases is the manufacture of a new cutter disk with a corrected profile.

SUMMARY OF THE INVENTION

The invention comprises a method wherein three-dimensional cutter rotations relative to workpiece tooth flank surface are carried out so as to reposition the cutter relative to a gear workpiece so as to achieve a decrease and/or an increase in the pressure angle of the tooth flank surfaces. The method can be applied independently to left and right flank surfaces of a tooth slot or the rotations may be superimposed on one another to realize pressure angle corrections on both flanks of a tooth slot.

More particularly, the invention comprises a method of machining teeth of a gear workpiece by power skiving wherein the method comprises providing a cutting tool having a plurality of cutting blades, rotating the cutting tool, rotating the gear workpiece, and engaging the cutting tool with the gear workpiece to machine the teeth of the gear workpiece, the teeth each having left tooth flank surface and a right tooth flank surface. The method further comprises moving the cutting tool relative to the gear workpiece to effect positioning of the cutting tool around at least one of:

a) a profile symmetry line between the left tooth flank surface and the right tooth flank surface of the gear workpiece teeth, b) a profile tangent of at least one of the left tooth flank surface and the right tooth flank surface of the gear workpiece teeth, c) an axis perpendicular to the profile symmetry line between the left tooth flank surface and the right tooth flank surface of the gear workpiece teeth, and d) a profile normal of at least one of the left tooth flank surface and the right tooth flank surface of the gear workpiece teeth, whereby the cutting tool is repositioned relative to the gear workpiece thereby achieving a decrease and/or an increase in the pressure angle of at least one of the left tooth flank surface and the right tooth flank surface of the gear workpiece teeth.

BRIEF DESCRIPTION OF THE DRAWINGS

FIG. 4(a) shows a three-dimensional view of a simplified gear slot with a cutting blade which is rotated by an angle φ around a line which is perpendicular to the profile symmetry line.

FIG. 4(b) is a front view of FIG. 4(a) showing an increase in pressure angle due to the rotation by the angle φ.

FIG. 4(c) is a side view of FIG. 4(a) showing a reduction of the profile depth h to h* due to the rotation φ.

FIG. 5(a) illustrates a three-dimensional view of a simplified gear slot with a cutting blade which is rotated by an angle φ around the profile normal of the left flank in order to achieve a single flank correction which increases the pressure angle on the right flank.

FIG. 5(b) is a front view of FIG. 5(a) showing an increase of the pressure angle on the right flank.

FIG. 5(c) illustrates a simplified gear slot showing both left flank normal and right flank normal with an angle φ correction rotation about each normal.

FIG. 6 is a text box which advises that the gear workpiece is a spur gear workpiece or a helical gear workpiece.

FIG. 7 is a text box which advises that the teeth are internal gear teeth or external gear teeth.

DETAILED DESCRIPTION OF THE PREFERRED EMBODIMENT

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance.

The details of the invention will now be discussed with reference to the accompanying drawings which illustrate the invention by way of example only.

The inventive method comprises three-dimensional cutter positioning (i.e. rotations) around at least one of the profile symmetry line, a flank profile tangent, a flank profile normal and/or an axis perpendicular to the profile line of symmetry relative to the left and/or right tooth flank surfaces of a gear workpiece so as to reposition a cutter relative to a gear workpiece whereby a reduction and/or an increase in the pressure angles of the tooth flank surfaces of the gear workpiece will be achieved by the cutting process. The process is applicable to the manufacture of teeth from a gear workpiece blank (e.g. soft cutting or rough cutting) as well as to a finishing process (e.g. hard cutting or hard finishing) for previously (rough) cut and hardened gear teeth. Therefore, the gear workpiece is understood to include a gear blank (initial formation of teeth) as well as a previously cut gear (finishing machining of teeth).

Figure 1:
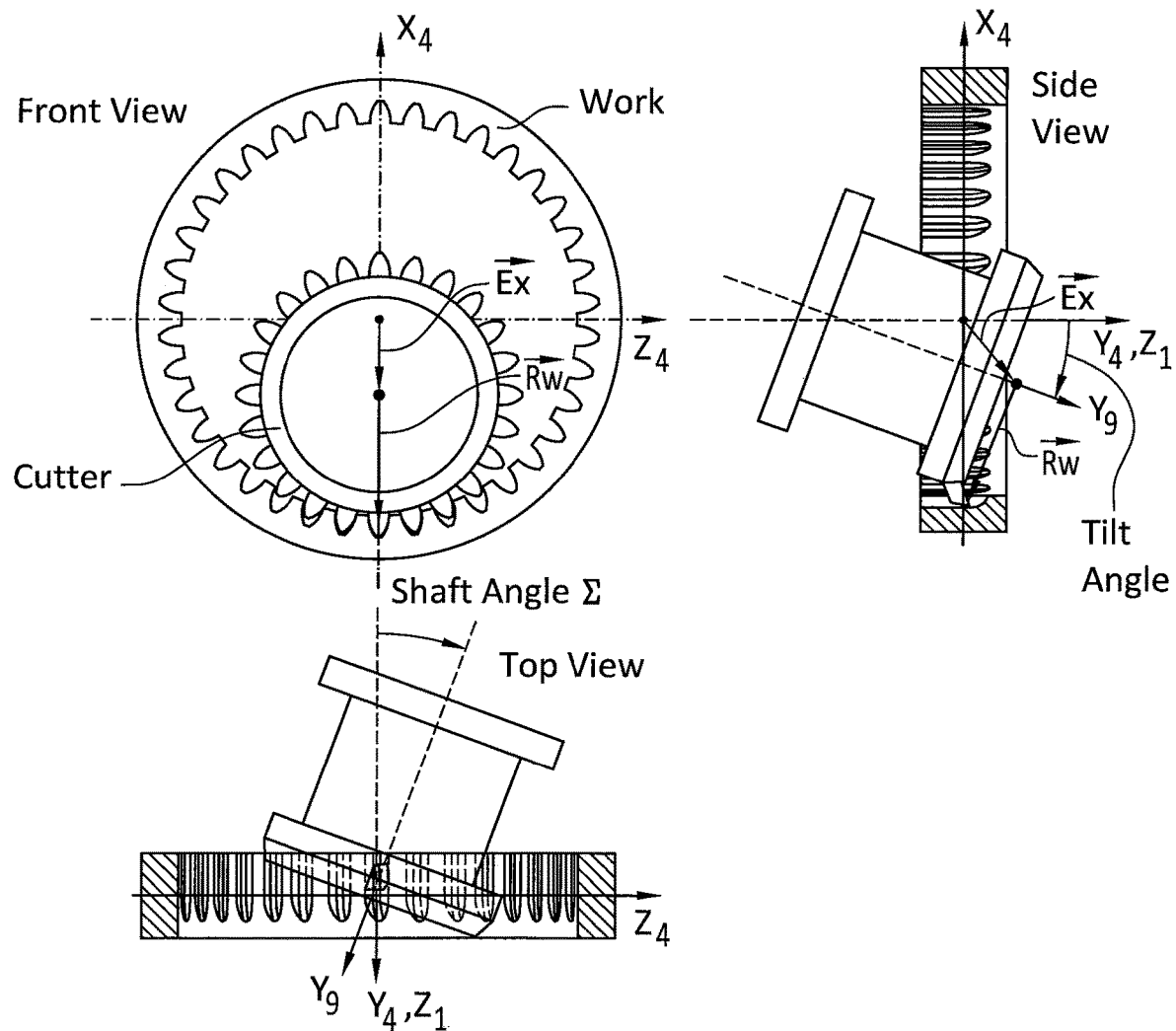
FIG. 1 shows a front view, a side view and a top view of the power skiving arrangement between a workpiece and a cutter.
Figure 2A:
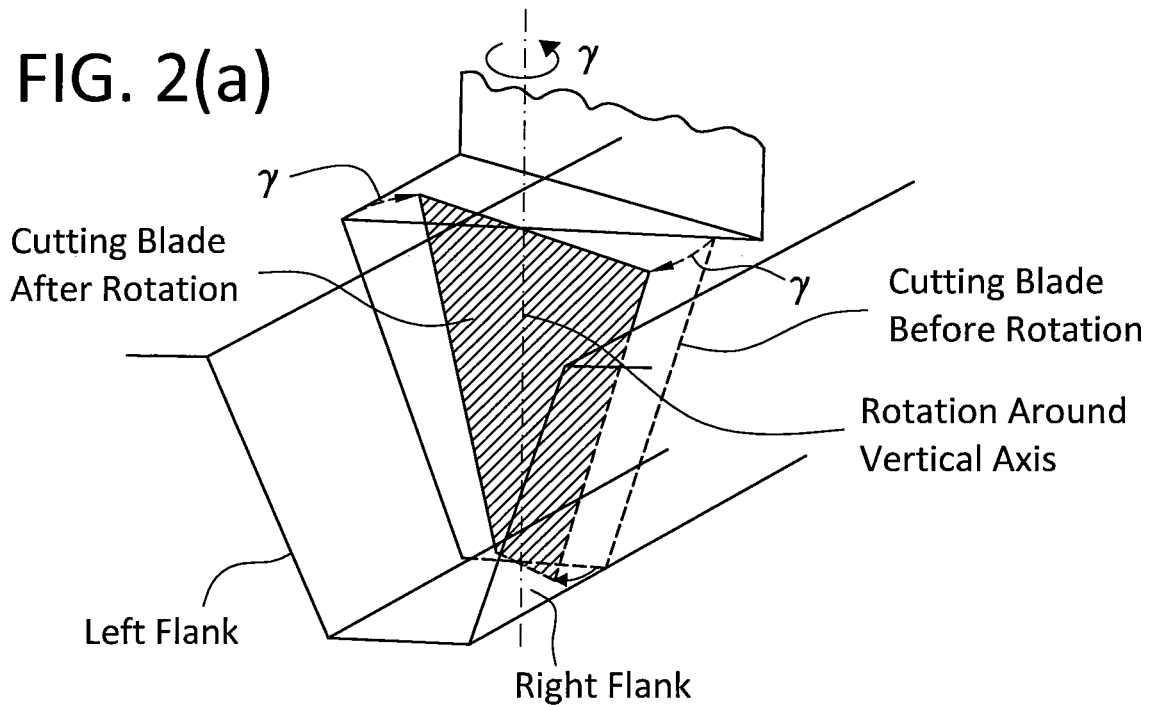
FIG. 2(a) shows a three-dimensional view of a simplified gear slot with a cutting blade, which is rotated by an angle γ in order to achieve a pressure angle reduction
Figure 2B:
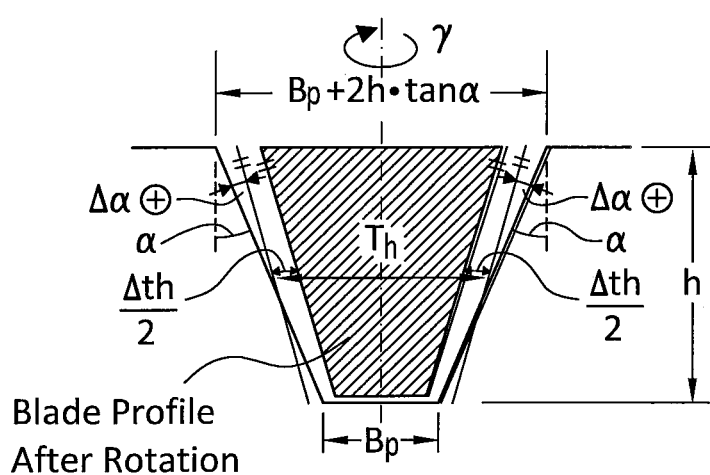
FIG. 2(b) shows a front view of FIG. 2(a) with a pressure angle reduction resulting from the rotation by an angle γ.
Figure 2C:
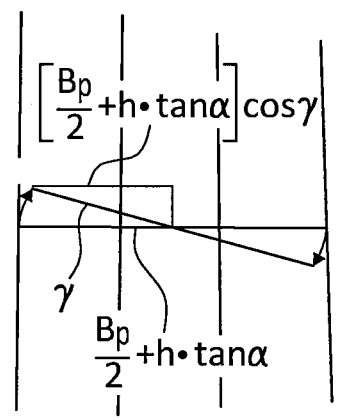
FIG. 2(c) is a top view of FIG. 2(a) showing the geometrical relationships between corrective rotation γ and pressure angle reduction Δα.

FIG. 2(a) shows a simplified trapezoidal blade profile with cutting edges on both sides of the trapezoid. Between the tool tooth and the work gear tooth slot (formed between adjacent workpiece teeth) is the virtual generating rack profile which has a straight sided, trapezoidal profile. The simplified blade is located in the trapezoidal channel which represents the reference profile also called the generating rack. The three-dimensional view in FIG. 2(a) shows the rotation of the blade profile around the profile symmetry line between the left tooth flank surface and the right tooth flank surface which is shown as a vertical axis. The rotation angle is labeled γ in the front view at the bottom left in FIG. 2(b). The top view at the blade and the trapezoidal channel is shown at the bottom right in FIG. 2(c). Both bottom views in FIGS. 2(b) and 2(c) include sufficient graphical information for the derivation of the rotation angle γ around the vertical axis required to achieve a desired pressure angle reduction Δα of the tooth surface (internal or external) of a workpiece such as a spur or helical gear.

Equation (1) shows the relationship between the correction Δα and the rotation γ:

$$\alpha + \Delta\alpha = \arctan\left\{\frac{[B_p + 2h \cdot \tan\alpha]\cos\gamma - B_p \cos\gamma}{2 \cdot h}\right\} \quad (1)$$

Figure 3A:
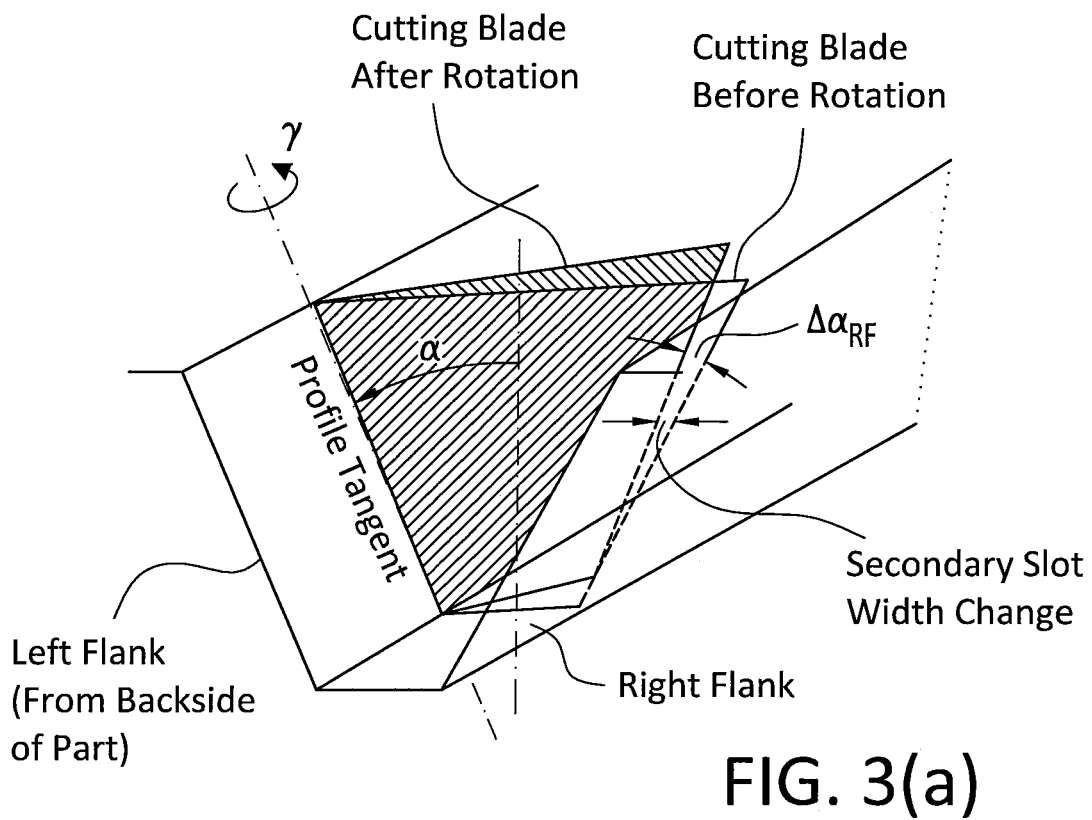
FIG. 3(a) illustrates a three-dimensional view of a simplified gear slot with a cutting blade which is rotated by an angle γ around the profile tangent to the left flank in order to achieve a single flank correction which reduces the pressure angle on the right flank.
Figure 3B:
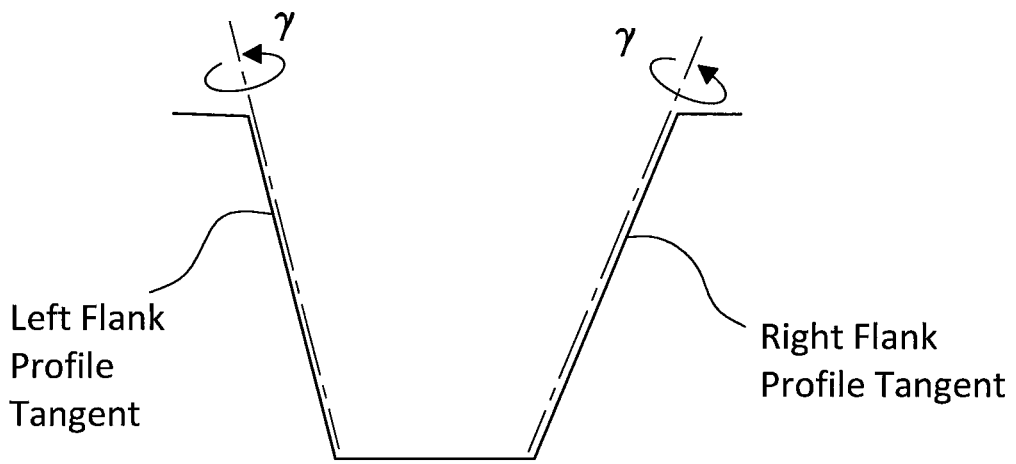
FIG. 3(b) illustrates a simplified gear slot showing both left flank profile tangent and right flank profile tangent with an angle γ correction rotation about each tangent.

A preferred embodiment of a pressure angle reduction on a workpiece is shown in FIGS. 3(a) and 3(b). The three-dimensional view of the blade profile and the trapezoidal channel in FIG. 3(a) shows a rotation of the blade profile around the profile tangent to the left flank. Due to the identical tangent between the trapezoidal channel and the blade profile, a rotation γ will not influence the pressure angle of the left flank, but achieve about twice the pressure angle reduction on the right flank for a given rotation angle γ compared to the principle shown in FIG. 2(a). A rotation around the profile tangent may cause a slightly distorted involute on the left and right flank profiles. The distortion is caused by the fact that the blade profile is not equal to the straight reference profile but is also an involute which is developed from the reference profile similar to the work gear profile. However, any such distortion is negligible. Because of the effect of the pressure angle correction on the right flank, only very small corrective rotation angles are required, which makes any side effects (e.g. secondary slot width change) on the left flank and right flank effectively negligible in most cases. However, should a slot width correction be desired, the original slot width can be re-established by a small amount of deeper cutting.

An analogous correction can also be applied to correct the left flank, if the blade cutting edge profile at the right flank is rotated around the profile tangent to the right flank as can be understood from the Right Flank Profile Tangent in FIG. 3(b). A rotation around the profile tangent will cause a slightly distorted involute above and below the profile reference height of the right flank but the pressure angle of the right flank will remain constant. The distortion is caused by the fact that the blade profile is not equal to the straight reference profile but is also an involute which is developed from the reference profile similar to the work gear profile. Because of the effect of the inventive pressure angle correction (reduction) on the left flank of the gear teeth, only very small corrective rotation angles are required, which makes any side effects (e.g. secondary slot width change) on the left flank and the right flank negligible. However, as discussed above, should a slot width correction be desired, the original slot width can be re-established by a small amount of deeper cutting.

It is notable that the correction principles presented in FIGS. 2(a)-(c) and FIGS. 3(a) and 3(b) are only suitable for a pressure angle reduction. Even if the rotation angle γ is reversed, a pressure angle reduction will still occur. Looking to the correction method of FIGS. 2(a)-(c) regarding a reverse rotation will make it clear that the reverse rotation around the profile tangent will also reduce the pressure angle of the right and/or left flank.

The invention further includes utilizing corrections of the same or differing amounts about both left flank and right flank profile tangents as shown in FIG. 3(b) to effect pressure angle reductions (same or different) on both right and left tooth flanks of a workpiece. The combined corrections about both left flank and right flank profile tangents effectively result in a correction defined about a line located between the left flank and right flank profile tangents.

In order to increase the pressure angle, a blade profile rotation around an axis which is perpendicular to the profile symmetry line can be employed. This principle of rotating the blade profile is shown in the three-dimensional view in FIG. 4(a). FIG. 4(b) shows a front view and FIG. 4(c) shows a side view of the trapezoidal channel of FIG. 4(a). FIGS. 4(b) and 4(c) include sufficient graphical information for the derivation of the rotation angle φ around the horizontal axis required to achieve a desired pressure angle increase Δα. Equations (2) and (3) relate to FIGS. 4(a)-(c) and solve the relationship between the rotation angle φ and the correction Δα:

$$h^* = h \cdot \cos\varphi \quad (2)$$

$$b = h \cdot \tan\alpha$$

$$b = h^* \cdot \sin(\alpha + \Delta\alpha) = h \cdot \cos\varphi \cdot \sin(\alpha + \Delta\alpha) \rightarrow \Delta\alpha = \arctan\left(\frac{b}{h} \cdot \frac{1}{\cos\varphi}\right) - \alpha$$

$$\tan(\alpha + \Delta\alpha) = \frac{\tan\alpha}{\cos\varphi} \quad (3)$$

$$\varphi = \arccos\left(\frac{\tan\alpha}{\tan(\alpha + \Delta\alpha)}\right) \quad (4)$$

Another preferred embodiment for a pressure angle increase is shown in FIGS. 5(a), 5(b) and 5(c). The three-dimensional view of the blade profile and the trapezoidal channel in FIG. 5(a) shows a rotation of the blade profile around the profile normal to the left flank of a tooth. Due to the identical normal between the trapezoidal channel and the blade profile, a rotation φ will not influence the pressure angle of the left flank, but achieve about twice the pressure angle increase on the right flank for a given rotation angle γ compared to the principle shown in FIG. 4(a). A rotation around the profile normal will cause a slightly distorted, but negligible, involute on the left and right flank profile. The distortion is caused by the fact that the blade profile is not equal to the straight reference profile but is also an involute which is developed from the reference profile similar to the work gear profile.

Because of the effect of the inventive pressure angle correction (increase) on only one of the two flanks of the gear teeth, only very small corrective rotation angles are required, which makes any side effects (e.g. tooth depth change) on the right flank negligible.

The analogous correction can also be applied to correct the left flank, if the blade cutting edge at the right flank is rotated around the profile normal of the right flank as can be understood from the Right Flank Normal in FIG. 5(c). Because of the effect of the inventive pressure angle correction (increase) on only one of the two flanks of the gear teeth, only very small corrective rotation angles are required, which makes any side effects (e.g. tooth depth change) on the left flank negligible.

The inventive correction shown in FIGS. 5(a) and 5(b) provides for an increase of the pressure angle of either the right or the left flank independently. However, this correction cannot reduce the pressure angle by simply reversing the profile normal rotation. Observing the correction method of FIG. 4 regarding a reverse rotation will make it clear that the reverse profile normal rotation will also increase the pressure angle of the right and/or left flank.

The invention further includes utilizing corrections of the same or differing amounts about both left flank normal and right flank normal as shown in FIG. 5(c) to effect pressure angle increases (same or different) on both right and left tooth flanks of a workpiece. The combined corrections about both left flank normal and right flank normal effectively result in a correction defined about a line located within the three dimensional space of the workpiece tooth slot.

The invention further encompasses the combination of the two inventive corrections discussed above with respect to, for example, FIGS. 3(a), 3(b), 5(a), 5(b) and 5(c) thereby allowing independent pressure angle corrections to be achieved on the two flank types of a gear. For example, a combination of the two inventive corrections may result in an increase of the pressure angle on the left flanks of a gear and a reduction of the pressure angle on the right flanks of the same gear simultaneously by superimposing the two corrections. The combined corrections, flank tangent and flank normal, effectively result in a correction defined about a line located within the three dimensional space of the workpiece tooth slot.

The inventor has discovered a dependency between the magnification of the correction effects and the difference between tool axis inclination angle and helix angle. In cases of zero degree helix angle (spur gear) and a tool axis inclination angle versus the work gear axis of 20° the correction effect was amplified by a factor of about 100. In cases of 20° helix angle (helical gear) and a tool axis inclination versus the work gear axis also of 20° the correction effect was not amplified. In this case, the cutter was rotating in the normal plane of the work gear.

Preferably the cutter rotation plane is identical to the normal plane of the work gear. In those cases where cutters have a rotation plane which deviates from the work gear normal plane, the correction is magnified depending on the sine of the difference angle according to the relationship in Equation (5). A further adjustment in the case of internal work pieces, depending on the pitch diameter ratio between work and cutter is represented by Equation (6).

$$\Delta\alpha_{\mathit{eff}} = \Delta\alpha \cdot \left( \frac{1 + F_{red} \cdot \sin\,(\Sigma - \mathit{VZ} \cdot \beta \cdot \mathit{VZPS})}{\sin\,(20°)} \right) \cdot F_{int} \quad (5)$$

$$F_{int} = \frac{z}{(z_{cut} \cdot 0.6)} \quad (6)$$

Where:

$\Delta\alpha_{\mathit{eff}}$ . . . Effective pressure angle change $\Delta\alpha$ . . . Theoretically calculated pressure angle change $\Sigma$ . . . Inclination between cutter and work axis VZ . . . Helix direction sign. Right hand helix→VZ=+1, left hand helix→VZ=−1

VZPS . . . Cutting above center→VZPS=+1, cutting below center→VZPS=−1

$F_{red}$ . . . Reduction factor, empirically found, based on spur work gear and $\Sigma=20°$ $F_{int}$ . . . Adjustment factor in case of internal work pieces, based on cutter pitch diameter to work pitch diameter=60%

Z . . . number of teeth of the workpiece $Z_{cut}$ . . . theoretical number of teeth of the cutter While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of machining teeth of a gear workpiece by power skiving, said method comprising:
    providing a cutting tool having a plurality of cutting blades,
    rotating the cutting tool,
    rotating the gear workpiece,
    engaging the cutting tool with the gear workpiece to machine the teeth of the gear workpiece, the teeth each having a respective left tooth flank surface and a respective right tooth flank surface, wherein during the engaging, the cutting tool machines at the same time the left tooth flank surface of a first one of the cutting teeth and the right tooth flank surface of a second one of the cutting teeth, whereby the left tooth flank surface of the first one of the cutting teeth and the right tooth flank surface of the second one of the cutting teeth are machined at the same time by the cutting tool to each have a respective initial pressure angle,
    moving the cutting tool relative to the gear workpiece to effect positioning of the cutting tool around one of:
    a) a profile symmetry line between the left tooth flank surface and the right tooth flank surface of the gear workpiece teeth,
    b) a profile that is tangent to at least one of the left tooth flank surface and the right tooth flank surface of the gear workpiece teeth,
    c) an axis perpendicular to the profile symmetry line between the left tooth flank surface and the right tooth flank surface of the gear workpiece teeth, and
    d) a profile that is normal to at least one of the left tooth flank surface and the right tooth flank surface of the gear workpiece teeth, and
    in moving the cutting tool relative to the gear workpiece to effect positioning of the cutting tool, the cutting tool is repositioned from wherein the engaging occurred, and after having been repositioned, the cutting tool machines at least one of the left tooth flank surface of the first one of the cutting teeth and the right tooth flank surface of the second one of the cutting teeth in order to provide either a decrease or an increase in the initial pressure angle of the at least one of the left tooth flank surface of the first one of the cutting teeth and the right tooth flank surface of the second one of the cutting teeth.

2. The method of claim 1 wherein the gear workpiece is a spur gear workpiece or a helical gear workpiece.

3. The method of claim 1 wherein the gear workpiece is a gear blank.

4. The method of claim 1 wherein the gear workpiece is a previously cut gear comprising the teeth.

5. The method of claim 1,
    wherein the left tooth flank surface is located adjacent the right tooth flank surface, and
    wherein a tooth slot is defined between the left tooth flank surface of the first one of the cutting teeth and the right tooth flank surface of the second one of the cutting teeth.

6. The method of claim 1 wherein the teeth are internal gear teeth or external gear teeth.

7. The method of claim 1 wherein the amount of pressure angle decrease or increase may be the same or different for the left tooth flank surface and the right tooth flank surface.

* * * * *